(12) United States Patent
Nangare et al.

(10) Patent No.: US 8,896,956 B1
(45) Date of Patent: Nov. 25, 2014

(54) METHOD AND SYSTEM FOR READING CLOSELY-SPACED DATA TRACKS

(71) Applicant: Marvell International Ltd., Hamilton (BM)

(72) Inventors: Nitin Nangare, Santa Clara, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/048,328

(22) Filed: Oct. 8, 2013

Related U.S. Application Data

(60) Provisional application No. 61/720,742, filed on Oct. 31, 2012.

(51) Int. Cl.
*G11B 5/035* (2006.01)
*G11B 20/10* (2006.01)

(52) U.S. Cl.
CPC .................. *G11B 20/10046* (2013.01)
USPC .......................................................... 360/65

(58) Field of Classification Search
None
See application file for complete search history.

(56) References Cited

U.S. PATENT DOCUMENTS

| 2010/0027605 | A1* | 2/2010 | Sankaranarayanan et al. ............... 375/232 |
| 2011/0181978 | A1* | 7/2011 | Rub ................... 360/55 |

* cited by examiner

*Primary Examiner* — Regina N Holder

(57) ABSTRACT

A method for reading a track of data may include positioning a read head at an initial position relative to the track of data and obtaining initial track signals, filtering the initial track signals, positioning the read head at an initial subsequent position relative to the track of data and obtaining initial subsequent track signals, and filtering the initial subsequent track signals. In an initial equalization, the filtered initial track signals and the filtered initial subsequent track signals are equalized to obtain equalized track signals. The read head is positioned at a further subsequent position relative to the track of data and further subsequent track signals are obtained The further subsequent track signals are filtered. In a subsequent equalization, previously obtained equalized track signals and the filtered further subsequent track signals are equalized. A storage device operating according to the method may have an equalizer in hardware or firmware.

22 Claims, 7 Drawing Sheets

METHOD AND SYSTEM FOR READING CLOSELY-SPACED DATA TRACKS

CROSS REFERENCE TO RELATED APPLICATION

This claims the benefit of commonly-assigned U.S. Provisional Patent Application No. 61/720,742, filed Oct. 31, 2012, which is hereby incorporated by reference herein in its entirety.

FIELD OF USE

This disclosure relates to data storage systems of the type in which read and write heads move over tracks of data on a storage medium. More particularly, this disclosure relates to the reading of data tracks that are closely-spaced with and adjacent track or tracks.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example of a type of recording in which reading and writing are performed by a head that moves relative to the surface of the storage medium, data may be written in circular (or sometime spiral) tracks on a magnetic disk. In many magnetic recording systems, minimum track pitch is limited by the write head width, while the read head is designed to be narrower than the write head so that reading can occur without picking up signals from any adjacent track. In addition, guard bands—empty bands on either side of each track—are provided to help prevent data on one track from being overwritten during writing of an adjacent track because of write head positioning errors.

In other magnetic recording systems, in order to increase recording densities, it is desirable to shrink the track pitch and reduce or remove the guard bands between the tracks, which allows more tracks to fit on the recording medium. For example, in "Shingled Magnetic Recording," also known as "Shingle Write Recording," the tracks are written so that one track partially overlaps the previous track. In such a system, track pitch theoretically may be arbitrarily small.

SUMMARY

According to one implementation, a method for reading a track of data may include positioning a read head at an initial position relative to the track of data and obtaining initial track signals, filtering the initial track signals, positioning the read head at an initial subsequent position relative to the track of data and obtaining initial subsequent track signals, and filtering the initial subsequent track signals. In an initial equalization, the filtered initial track signals and the filtered initial subsequent track signals are equalized to obtain equalized track signals. The read head is positioned at a further subsequent position relative to the track of data and further subsequent track signals are obtained The further subsequent track signals are filtered. In a subsequent equalization, previously obtained equalized track signals and the filtered further subsequent track signals are equalized.

The method may further include obtaining an initial estimate of the track of data, wherein the initial equalization is performed relative to the initial estimate.

The method may further include repeating, at least once, the positioning the read head at a further subsequent position relative to the track of data, the obtaining further subsequent track signals, and the subsequent equalization.

A storage device according to one implementation may include a storage medium having at least one track of data thereon, and reading apparatus for reading one of the at least one track of data. The reading apparatus may includes a read head that is positionable at a plurality of positions relative to each of the at least one track of data, for obtaining respective track signals at each of the plurality of positions, an equalization module having equalizer inputs for two signals, and having an equalizer output, memory having memory inputs and memory outputs connected to the equalizer inputs and equalizer output, and a controller that commands the read head to move among the plurality of positions and that moves data between the equalization module and the memory via the memory inputs and memory outputs, and the equalizer inputs and equalizer output. The controller may position the read head at an initial position relative to the track of data to obtain initial track signals, store the initial track signals in the memory, position the read head at an initial subsequent position relative to the track of data to obtain initial subsequent track signals, store the initial subsequent track signals in the memory. In an initial equalization, the controller may input the initial track signals and the initial subsequent track signals to the equalization module to obtain equalized track signals, store the equalized track signals in the memory, position the read head at a further subsequent position relative to the track of data to obtain further subsequent track signals, store the further subsequent track signals in the memory. In a subsequent equalization, the controller may provide previously equalized track signals stored in the memory and the further subsequent track signals to the equalization module to obtain subsequent equalized track signals.

In some implementations of the storage device, the equalizer module may be a hardware module.

In other implementations of the storage device, the equalizer module may be executed in firmware.

In some implementations of the storage device, at least some positions in the plurality of positions may be identical positions.

In other implementations of the storage device, all positions in the plurality of positions may be different from each other.

The storage device may further include FIR filter circuitry that filters the track signals prior to storage in the memory.

The storage device may further include encoding circuitry that derives a track estimate from the track signals, wherein the equalization module performs equalization relative to the track estimate.

In some embodiments, the encoding circuitry may be non-return-to-zero encoding circuitry.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure relates to a method and system for recovering data from a data track whose optimum read offset may be uncertain, particularly when the data track overlaps with one or more adjacent data tracks, which makes head positioning more important. In practice, the optimum read offset location—i.e., the radial position of the read head over the track—can vary from track to track.

Figure 1:
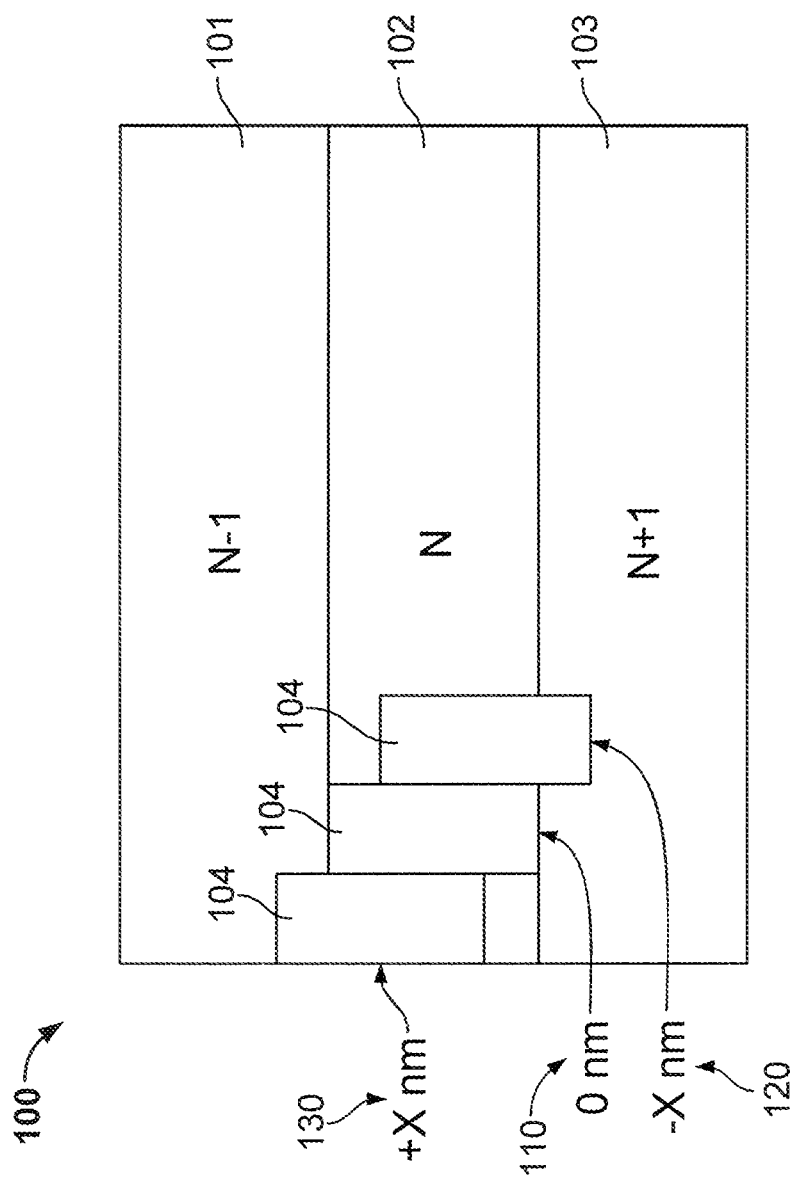
FIG. 1 is a schematic representation of a portion of a storage medium.

FIG. 1 shows a simplified schematic view of a portion of a storage device showing three adjacent data tracks 101, 102, 103 on a storage medium 100, with a read head 104. Read head 104 is shown at three different offsets to the nominal centerline of track 102. The portion of each track shown is the non-overlapped portion. As can be seen, the width of write head 104 is commensurate with the width of the non-overlapping track portion, making head positioning relative to the track position important in accurately reading the track data (as compared to techniques in which the tracks are widely separated and the read head is narrower than the track width).

In order to maximize the read-SNR (i.e., the signal-to-noise ratio during reading) for any given sector, sometimes it is useful to read that sector multiple times with different offsets, and then to equalize those different reads. For example, the three head positions 110, 120, 130 in FIG. 1 represent the same read head 104 positioned at 0 nm, −Xnm and +Xnm from the nominal centerline of track-N. The same sector can be read with head 104 in each of those positions, and then the three readings can be equalized to derive the data from that sector. This can be done for every track, or only in cases where a single read results in a read failure. It should be noted that all three reads can be from same offset—i.e., X could be equal to 0. It also should be noted that more than three reads could be taken.

Figure 2:
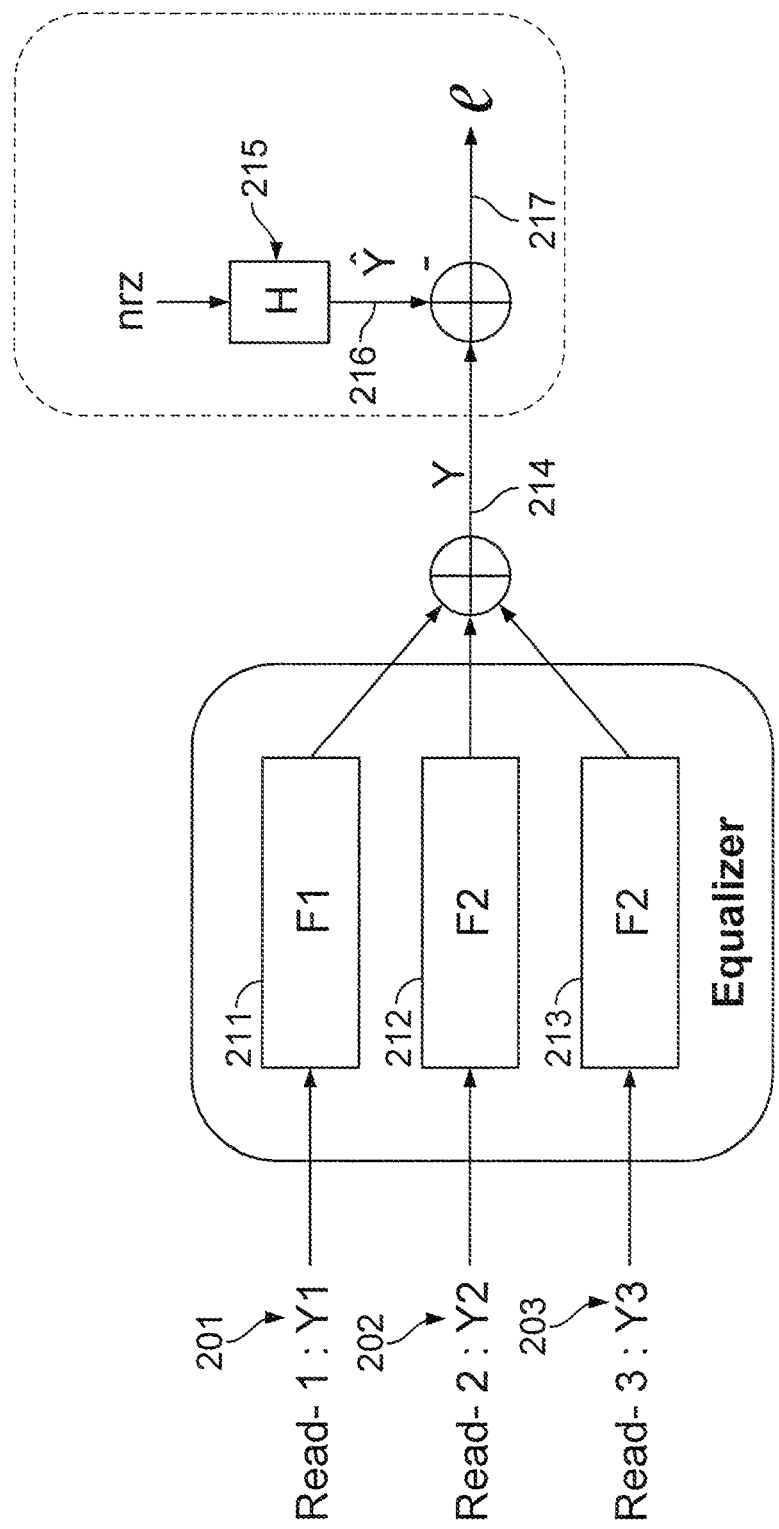
FIG. 2 is a diagrammatic representation of an equalization technique.

Equalization can be accomplished by suitable filtering. An example is shown in FIG. 2 where the results Y1 (201), Y2 (202), and Y3 (203) of three read operations, which may be obtained, e.g., by finite-impulse response (FIR) filtering of the read-head signals, are combined in equalizer 210 using respective filter functions 211, 212, 213 derived as described below. The combined signal 214 is then compared to an "ideal" signal 216, which may be derived, e.g., from a non-return-to-zero (NRZ) estimate 215 to yield an error term 217. Filter functions 211, 212, 213 can be derived mathematically to minimize error 216, using, e.g., minimum mean square error (MMSE) techniques.

For example, the error term e can be derived from:

$$E[\|e\|^2] = E\left[F_1 * Y_1 + F_2 * Y_2 + F_3 * Y_3 - \hat{Y}\right]^2$$

where $F_1$, $F_2$ and $F_3$ are the filter functions 211, 212, 213 to be found, $Y_1$, $Y_2$ and $Y_3$ are the signals (e.g., FIR signals) from the three passes of read head 104, $\hat{Y}$ is the idealized signal derived from an estimate (e.g., an NRZ estimate) of the track data as read, and E is an expectation function.

If each $F_a$ has 2l+1 taps (−l . . . , 0, . . . +l), then this can be written:

$$E[e^2(n)] = E\left[F_1 * Y_1 + F_2 * Y_2 + F_3 * Y_3 - \hat{Y}\right]^2 \text{ or}$$

$$E[e^2(n)] = E\left[\sum_{i=-l}^{+l} f_1(i) \cdot y_1(n-i) + \sum_{i=-l}^{+l} f_2(i) \cdot y_2(n-i) + \sum_{i=-l}^{+l} f_3(i) \cdot y_3(n-i) - \hat{y}(n)\right]^2$$

In order to minimize the squared error, for the jth filter tap of each combiner filter one can write:

$$\frac{\partial E[e^2(n)]}{\partial f_1(j)} = 2E\left[\sum_{i=-l}^{+l} f_1(i) \cdot y_1(n-i) + \sum_{i=-l}^{+l} f_2(i) \cdot y_2(n-i) + \sum_{i=-l}^{+l} f_3(i) \cdot y_3(n-i) - \hat{y}(n)\right] \cdot y_1(n-j) = 0$$

$$\frac{\partial E[e^2(n)]}{\partial f_2(j)} = 2E\left[\sum_{i=-l}^{+l} f_1(i) \cdot y_1(n-i) + \sum_{i=-l}^{+l} f_2(i) \cdot y_2(n-i) + \sum_{i=-l}^{+l} f_3(i) \cdot y_3(n-i) - \hat{y}(n)\right] \cdot y_2(n-j) = 0$$

$$\frac{\partial E[e^2(n)]}{\partial f_3(j)} = 2E\left[\sum_{i=-l}^{+l} f_1(i) \cdot y_1(n-i) + \sum_{i=-l}^{+l} f_2(i) \cdot y_2(n-i) + \sum_{i=-l}^{+l} f_3(i) \cdot y_3(n-i) - \hat{y}(n)\right] \cdot y_3(n-j) = 0$$

If $$E\left[\left(\sum_{i=-l}^{+l} f_1(i) \cdot y_1(n-i) + \sum_{i=-l}^{+l} f_2(i) \cdot y_2(n-i) + \sum_{i=l}^{+l} f_3(i) \cdot y_3(n-i)\right) \cdot y_1(n-j)\right] = E[\hat{y}(n) \cdot y_1(n-j)]$$

$$E\left[\left(\sum_{i=-l}^{+l} f_1(i) \cdot y_1(n-i) + \sum_{i=-l}^{+l} f_2(i) \cdot y_2(n-i) + \sum_{i=l}^{+l} f_3(i) \cdot y_3(n-i)\right) \cdot y_2(n-j)\right] = E[\hat{y}(n) \cdot y_2(n-j)]$$

$$E\left[\left(\sum_{i=-l}^{+l} f_1(i) \cdot y_1(n-i) + \sum_{i=-l}^{+l} f_2(i) \cdot y_2(n-i) + \sum_{i=l}^{+l} f_3(i) \cdot y_3(n-i)\right) \cdot y_3(n-j)\right] = E[\hat{y}(n) \cdot y_3(n-j)]$$

then we can write a correlation matrix $R_{y_a y_b}$ as follows:

$$R_{y_a y_b} = \begin{bmatrix} E[y_a(-l) \cdot y_b(-l)] & \cdots & E[y_a(-l) \cdot y_b(0)] & \cdots & E[y_a(-l) \cdot y_b(+l)] \\ \vdots & \ddots & & & \vdots \\ E(y_a(0) \cdot y_b(-l)] & & E[y_a(0) \cdot y_b(0)] & & E[y_a(0) \cdot y_b(+l)] \\ \vdots & & & \ddots & \vdots \\ E[y_a(+l) \cdot y_b(-l)] & \cdots & E[y_a(+l) \cdot y_b(0)] & \cdots & E[y_a(+l) \cdot y_b(+l)] \end{bmatrix}_{L \times L}$$

where L=2l+1.

Combining all equations for all filter taps of all equalization filters $F_a$, one can write $$\begin{bmatrix} R_{y_1 y_1} & R_{y_1 y_2} & R_{y_1 y_3} \\ R_{y_2 y_1} & R_{y_2 y_2} & R_{y_2 y_3} \\ R_{y_3 y_1} & R_{y_3 y_2} & R_{y_3 y_3} \end{bmatrix} \begin{bmatrix} F_1 \\ F_2 \\ F_3 \end{bmatrix} = \begin{bmatrix} E[Y_1 \cdot \hat{Y}] \\ E[Y_2 \cdot \hat{Y}] \\ E[Y_3 \cdot \hat{Y}] \end{bmatrix}$$

from which one can solve for the $F_a$:

$$\begin{bmatrix} F_1 \\ F_2 \\ F_3 \end{bmatrix} = \begin{bmatrix} R_{y_1 y_1} & R_{y_1 y_2} & R_{y_1 y_3} \\ R_{y_2 y_1} & R_{y_2 y_2} & R_{y_2 y_3} \\ R_{y_3 y_1} & R_{y_3 y_2} & R_{y_3 y_3} \end{bmatrix}^{-1} \begin{bmatrix} E[Y_1 \cdot \hat{Y}] \\ E[Y_2 \cdot \hat{Y}] \\ E[Y_3 \cdot \hat{Y}] \end{bmatrix}$$

Figure 3:
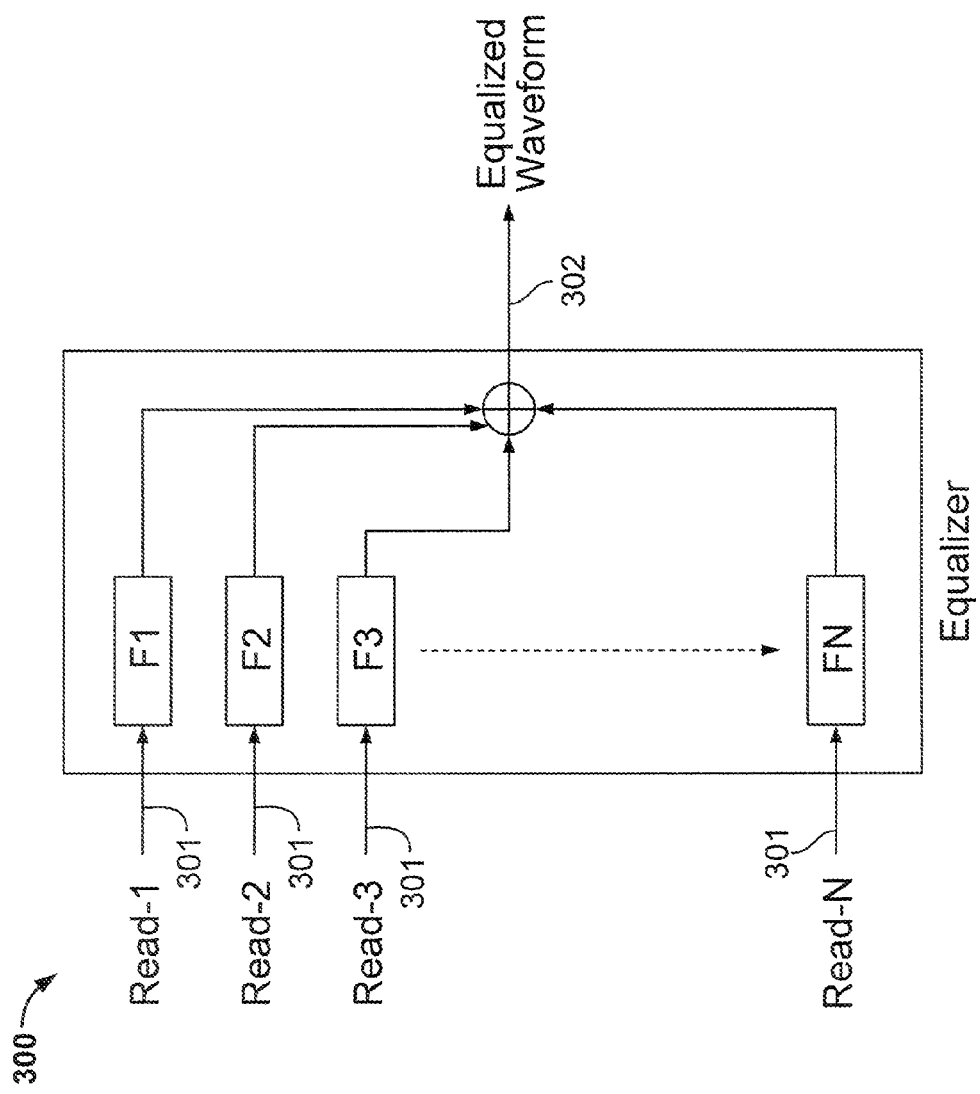
FIG. 3 is a diagrammatic representation of "parallel" equalization.

If a=N, then a track is read N times to derive N FIR samples 301 of that track, or the track may be read fewer than N times and mathematical techniques, such as FIR averaging, can be used to derive additional samples up to N samples. The N samples, however obtained, may be equalized as shown in FIG. 3 to derive equalized waveform 302. The equalized waveform may then be decoded using any suitable decoding technique, which may include an iterative decoder.

The equalization technique shown in FIG. 3 may be described as "parallel" equalization. However, because N may be arbitrarily large, such parallel equalization techniques could require the provision of arbitrarily large filter hardware. Moreover, the derivation of the N filters would require matrix calculations involving N×N matrices, including inversion of an N×N matrix of correlation matrices $R_{y_a y_b}$.

Figure 4:
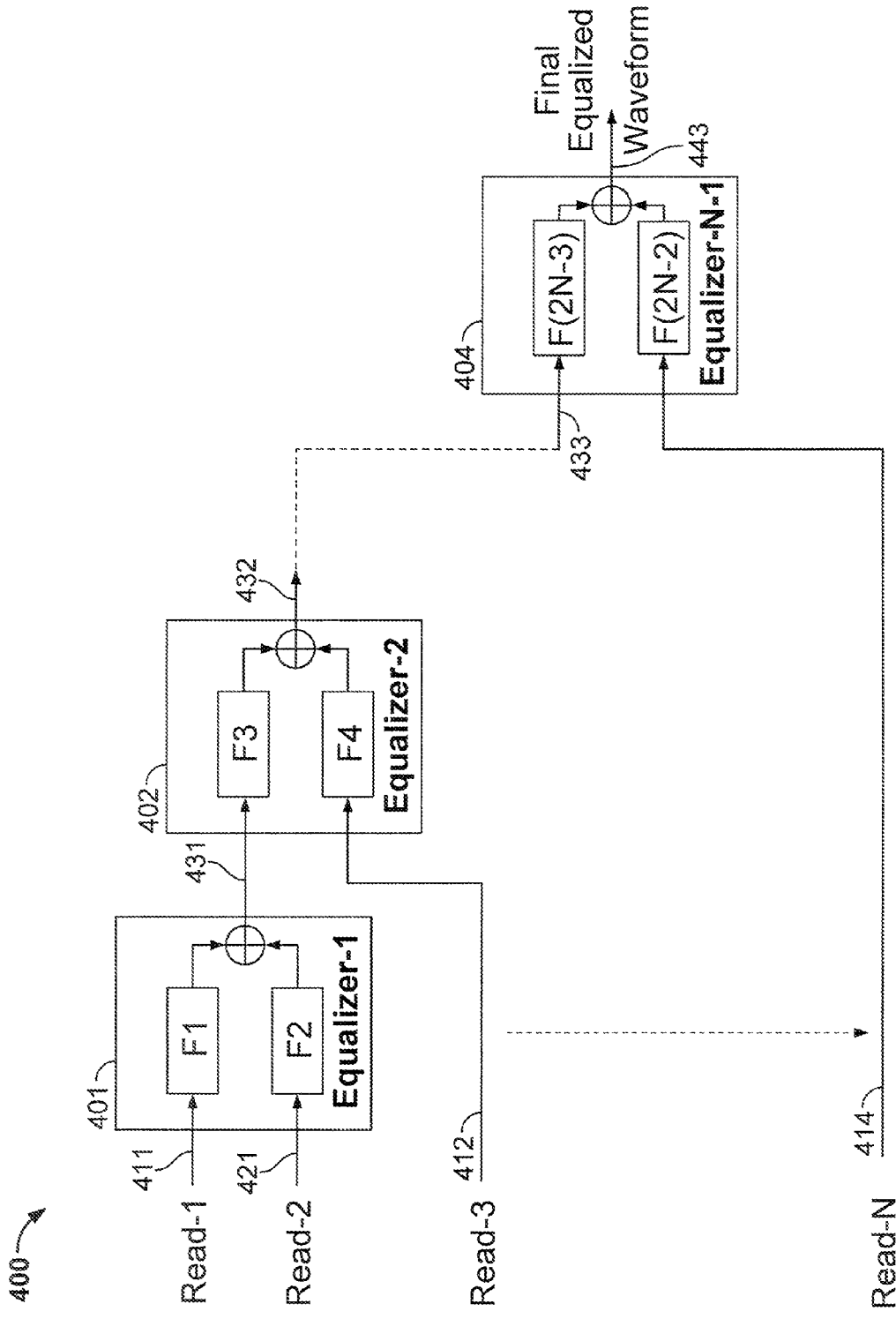
FIG. 4 is a diagrammatic representation of "serial" equalization in accordance with implementations of this disclosure.

Alternatively, in accordance with implementations of this disclosure, a "serial" equalization technique, an example 400 of which is shown in FIG. 4, may be used. In such a serial equalization technique, only two sets of samples (e.g., FIR samples) are equalized at a time. Thus, equalizer 401 processes Read-1 and Read-2 samples 411, 421 using filters $F_1$ and $F_2$, respectively. The output signal 431 of equalizer 401 is processed in equalizer 402 along with the Read-3 sample 412, using filter $F_3$ for signal 411 and filter $F_4$ for the Read-3 sample 412. The output signal 432 of equalizer 402 is similarly processed in another two-input equalizer (not shown) with the Read-4 sample (not shown) using filter $F_5$ for signal 432 and filter $F_6$ for the Read-4 sample and, and so on until the output signal 433 of the (N−2)th equalizer (not shown) is processed in (N−1)th equalizer 404 along with the Read-N sample 414, using filter $F_{2N−3}$ for signal 433 and filter $F_{2N−2}$ for the Read-N sample 414, to obtain final equalized signal 443.

Example 400 of FIG. 4 could represent an actual circuit implementation of this disclosure. However, example 400 is primarily intended to illustrate, theoretically, the serial technique according to implementations of this disclosure.

One consequence of the "serial" approach of FIG. 4 is a reduction in the necessary computational capacity. In some implementations of this disclosure, for each stage, the same two-input module, whether implemented in hardware or firmware, can be reused. The one two-input module can be reused as many times as needed, rather than providing an arbitrarily large "parallel" module, or an arbitrary high number of two-input modules. In addition, in computing the filters, because the correlations of only two track reads are involved, the matrices used in the computations are 2×2 matrices, which simplifies the computations as compared to arbitrarily large N×N matrices.

Although in the case of parallel implementation 300 of FIG. 3 the number of filters to be derived is the same as the number, N, of read offset samples, it can be seen from FIG. 4 that the number of filters to be derived in serial implementation 400 is equal to 2N−2, which exceeds N for any N≥3. This is because in each stage, the result of the previous stage is used as an input as though it were read offset data to be equalized. Therefore, there are effectively more samples to be filtered.

One way in which the filters can be derived is to record a known pattern and then precompute all of the filters from that pattern. If the pattern is known, then instead of using NRZ estimates for Y, one can use the actual known data. This precomputation can be done at manufacturing time, and optionally at additional set time intervals thereafter.

However, because the deviation of any track from its nominal centerline can vary each time data are written to the track, another approach is to derive the filters as needed, from the actual data to be read. As will be discussed below, in practice there is sufficient time during one disk rotation—i.e., one track read operation—to perform the filter computations.

Figure 5:
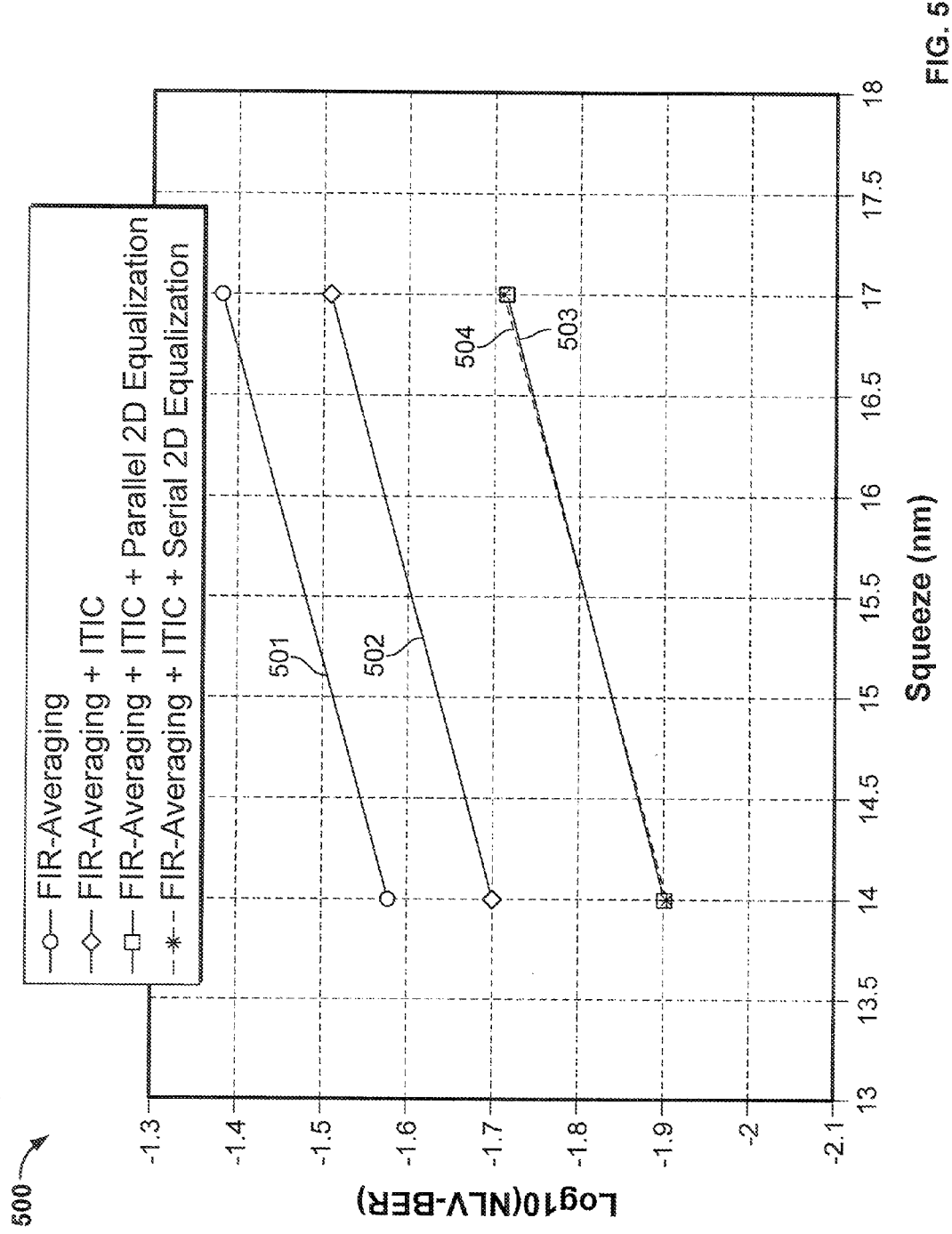
FIG. 5 is a graph comparing performance of different filtering techniques.

It can be shown experimentally that the "serial" approach provides bit-error-rate performance comparable to the "parallel" approach. Moreover, the performance can be further improved by combining this equalization technique with inter-track interference (ITI) cancellation techniques to reduce the contributions from adjacent tracks, particularly when the current track is read substantially off its centerline. FIG. 5 shows the results of an experimental comparison 500 of the bit error rate, as a function of the "track squeeze" resulting from shingle recording, when reading a track using different combinations of techniques. Trace 501, with the highest bit error rate regardless of the degree of track squeeze, is the result of using only FIR-averaging on the read signals. Trace 502, with the next highest bit error rate regardless of the degree of track squeeze, is the result of using FIR-averaging together with ITI cancellation techniques on the read signals. Traces 503 and 504, which are nearly coincident with one another at the lowest bit error rates regardless of the degree of track squeeze, are the results, respectively, of using FIR-averaging together with ITI cancellation techniques and parallel or serial equalization on the read signals. As can be seen, there is barely any difference between the serial and parallel cases 504, 504.

Figure 6:
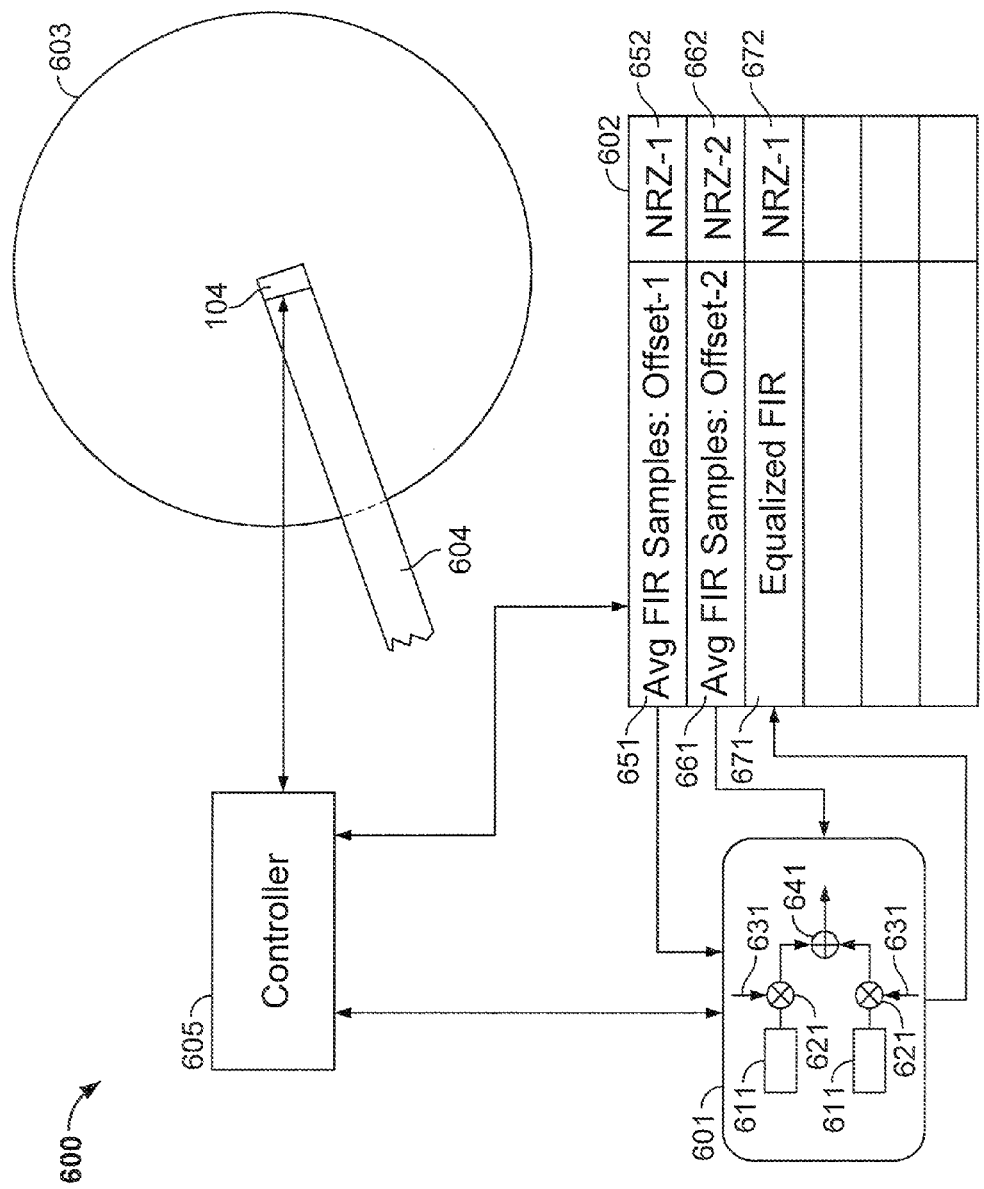
FIG. 6 is a schematic representation of an implementation of this disclosure.

FIG. 6 shows an implementation in a system 600, in which one equalization module 601 is used with one memory 602. System 600 also includes a storage medium 603, which may be a magnetic disk, having a read head 104 on arm 604 (head 104 may also be used for writing, or a separate write head (not shown) may be provided). A storage controller 605 controls the movement of data among equalization module 601, one memory 602, and head 104. Equalization module 601 includes memories 611 for the two filters, as well a respective multiplier 621 for each filter and its corresponding read-value input 631, and an adder 641 to combine the two multiplication results.

For the first equalization stage out of the N−1 stages, Read-1 and Read-2 FIR samples are obtained along with corresponding NRZ estimates NRZ-1 and NRZ-2 and are stored in corresponding locations 651, 652 and 661, 662 in memory 602. The data are used to compute filters $F_1$ and $F_2$ (e.g., under control of controller 605) which are then loaded into equalization module 601. Read-1 and Read-2 (see above) FIR samples 611, 621 are then input into equalization module 601 to yield an equalized FIR sample that is stored in location 671 in memory 602. NRZ estimate NRZ-1 also is re-stored in memory 672 in location 632. It should be noted that memory 602 can be arbitrarily large, but in this serial implementation it can include as few as the six locations 651, 652, 661, 662, 671, 672.

In the next stage, the result of the previous stage (now stored in locations 671, 672) serves as one of the two "new" read samples that are to be equalized, with the Read-3 FIR sample (see above) being the other new sample. The Read-3 FIR sample and its accompanying NRZ estimate (which serves as NRZ-2 in this stage), are written to available locations in memory 602. In an implementation where memory 602 is the minimum size as described in the preceding paragraph, the Read-3 FIR sample and accompanying NRZ estimate would be written to original locations 651, 652, or locations 661, 662, overwriting what was stored there in the previous stage. The filters are re-derived from the two "new" inputs (i.e., the previous result which is treated as a first input, and Read-3 which is treated as a second input) and their corresponding NRZ estimates, and the two "new" inputs are then equalized using those filters. The equalization result of this stage is written to an available location in memory 602. If memory 602 is of the minimum size discussed above, the new result, along with its NRZ estimate, would be written to whichever of locations 651, 652 or locations 661, 662 were not used for the Read-3 data. If there are no more read samples, the new equalization results would be used as the final result. Otherwise, Read-4 data would then be written to whichever location of memory 602 was used for the results of the previous stage (671, 672 in this example), and equalization module 601 would be re-used to process the Read-4 data, and so on until all read samples were processed. In one variant of implementation 600, NRZ-1 is assigned as the NRZ estimate of the result. In such a variant, NRZ-1 is propagated to every stage and it may not be necessary to derive NRZ estimates for any other read FIR samples, allowing the minimum size of memory 602 to be even smaller.

As suggested above, equalization according to implementations of this disclosure can be performed in firmware, or partly in hardware and partly in firmware. It also may be possible to perform equalization completely in hardware, but the calculation of the filters may be inefficient in hardware. The computation of the filter taps from the correlation matrices and loading of those filters into equalizer module 601 is more efficiently carried out in firmware at, e.g., controller 605.

As mentioned above, these operations can be carried out quickly enough that the filters can be determined and the equalization carried out well within the time needed to decode an entire track, or sector of a track. For example, the data to be read may include 128 or 256 codewords, whereas in a hardware implementation, equalization, including detecting the data, computing the correlations, deriving the filters from the correlations, and performing the equalization filtering, can be carried out in about nine codeword intervals (about five codeword intervals to compute the correlations, about one codeword interval to derive the filters from the correlations, and about three codeword intervals to perform the equalization filtering). Although the operations may take longer in an all-firmware implementation, it would still be possible to complete them within a single revolution of the storage medium. Therefore, no inefficiency is introduced by performing this equalization technique on the actual data as needed.

Figure 7:
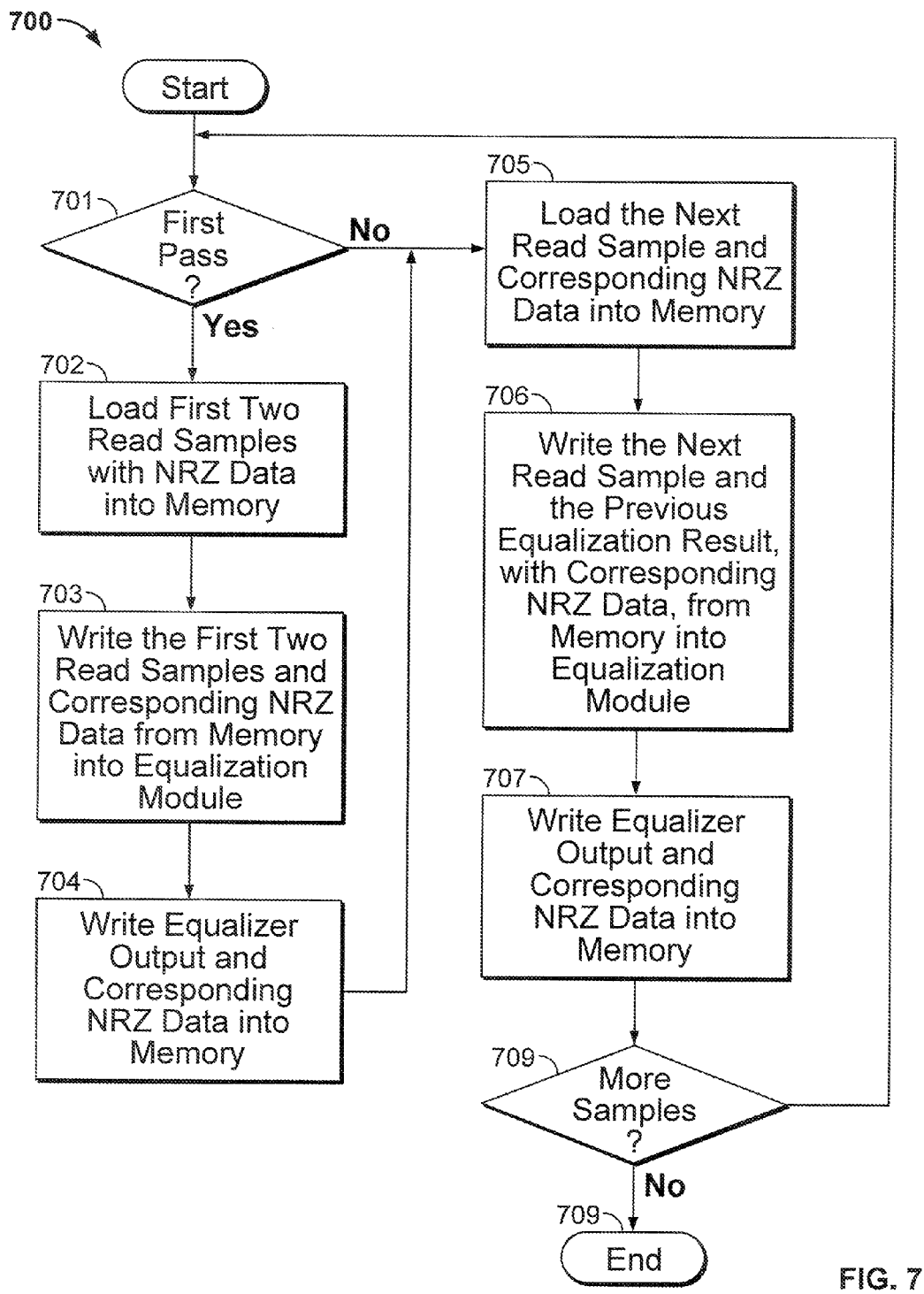
FIG. 7 is a flow diagram of an exemplary iterative method according to this disclosure.

FIG. 7 is a flow diagram of an example of a method 700 according to this disclosure. The indicated method operations may be undertaken using either of the hardware or firmware/hardware implementations described above. At 701, it is determined whether the processing of the first two read samples is to be performed. If processing of the first two read samples is not to be performed, the method advances to 705. If processing of the first two read samples is to be performed, the first two read samples (Read-1 and Read-2) with their corresponding NRZ estimates (NRZ-1 and NRZ-2), or at least NRZ-1 as discussed above, are loaded into memory at 702. At 703, those two read samples and their corresponding NRZ estimates are written from memory into the equalization module. At 704, the output of the equalization module is written, along with the corresponding NRZ estimate (NRZ-1 in the implementations described above) back into memory, and the method advances to 705.

At 705, the next read sample, with its corresponding NRZ estimate, is loaded into memory. At 706, that next read sample, and the previous equalization result, with their corresponding NRZ estimates, are written from memory into the equalization module. At 707, the output of the equalization module is written, along with the corresponding NRZ estimate (NRZ-1 in the implementations described above) back into memory. As described above, this new result could overwrite one of the now-unneeded read samples, or, if the memory is large enough, it could be written to a new location in memory.

At 708, it is determined whether there are any more samples. If not, the method ends at 709; otherwise, the method returns to 701 for another pass.

Thus it is seen that a data storage system, and method of decoding stored data, in which multiple reads from a single track are equalized, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for reading a track of data, the method comprising:
   positioning a read head at an initial position relative to the track of data and obtaining initial track signals;
   filtering the initial track signals;
   positioning the read head at an initial subsequent position relative to the track of data and obtaining initial subsequent track signals;
   filtering the initial subsequent track signals;
   in an initial equalization, equalizing the filtered initial track signals and the filtered initial subsequent track signals to obtain equalized track signals;
   positioning the read head at a further subsequent position relative to the track of data and obtaining further subsequent track signals; and
   filtering the further subsequent track signals;
   in a subsequent equalization, equalizing previously obtained equalized track signals and the filtered further subsequent track signals.

2. The method of claim 1 further comprising obtaining an initial estimate of the track of data; wherein:
   the initial equalization is performed relative to the initial estimate.

3. The method of claim 2 wherein the subsequent equalization is performed relative to the initial estimate.

4. The method of claim 2 wherein the initial estimate is obtained in a training mode.

5. The method of claim 2 further comprising obtaining an initial subsequent estimate of the track of data; wherein:
   the subsequent equalization is performed relative to the initial subsequent estimate.

6. The method of claim 5 wherein the initial estimate and the initial subsequent estimate are respectively obtained when the read head is respectively in the initial position and the initial subsequent position.

7. The method of claim 1 further comprising repeating, at least once, the positioning the read head at a further subsequent position relative to the track of data, the obtaining further subsequent track signals, and the subsequent equalization.

8. The method of claim 7 further comprising obtaining an initial estimate of the track of data; wherein:
   the initial equalization is performed relative to the initial estimate.

9. The method of claim 8 wherein each subsequent equalization is performed relative to the initial estimate.

10. The method of claim 8 wherein the initial estimate is obtained in a training mode.

11. The method of claim 8 further comprising obtaining, at the initial subsequent position and at each further subsequent position, a respective subsequent estimate of the track of data; wherein:
    each respective repetition of the subsequent equalization is performed relative to the respective subsequent estimate.

12. The method of claim 11 wherein the initial estimate and each subsequent estimate are respectively obtained when the read head is respectively in the initial position and each subsequent position.

13. The method of claim 1 wherein at least some of the initial position, the initial subsequent position and the further subsequent position are identical positions.

14. The method of claim 1 wherein the initial position, the initial subsequent position and the further subsequent position are all different from each other.

15. A storage device comprising:
    a storage medium having at least one track of data thereon; and
    reading apparatus for reading one of the at least one track of data, the reading apparatus comprising:
    a read head that is positionable at a plurality of positions relative to each of the at least one track of data, for obtaining respective track signals at each of the plurality of positions;
    an equalization module having equalizer inputs for two signals, and having an equalizer output;
    memory having memory inputs and memory outputs connected to the equalizer inputs and equalizer output; and
    a controller that commands the read head to move among the plurality of positions and that moves data between the equalization module and the memory via the memory inputs and memory outputs, and the equalizer inputs and equalizer output; wherein the controller:
    positions the read head at an initial position relative to the track of data to obtain initial track signals;
    stores the initial track signals in the memory;
    positioning the read head at an initial subsequent position relative to the track of data to obtain initial subsequent track signals;
    stores the initial subsequent track signals in the memory;
    in an initial equalization, inputs the initial track signals and the initial subsequent track signals to the equalization module to obtain equalized track signals;
    stores the equalized track signals in the memory;
    positions the read head at a further subsequent position relative to the track of data to obtain further subsequent track signals;
    stores the further subsequent track signals in the memory; and
    in a subsequent equalization, provides previously equalized track signals stored in the memory and the further subsequent track signals to the equalization module to obtain subsequent equalized track signals.

16. The storage device of claim 15 wherein the equalizer module is a hardware module.

17. The storage device of claim 15 wherein the equalizer module is executed in firmware.

18. The storage device of claim 15 wherein at least some positions in the plurality of positions are identical positions.

19. The storage device of claim 15 wherein all positions in the plurality of positions are different from each other.

20. The storage device of claim 15 further comprising FIR filter circuitry that filters the track signals prior to storage in the memory.

21. The storage device of claim 15 further comprising encoding circuitry that derives a track estimate from the track signals, wherein the equalization module performs equalization relative to the track estimate.

22. The storage device of claim 21 wherein the encoding circuitry is non-return-to-zero encoding circuitry.

* * * * *